United States Patent [19]

Healey et al.

[11] Patent Number: 4,619,813
[45] Date of Patent: Oct. 28, 1986

[54] GAS ABSORPTION SYSTEM

[75] Inventors: James A. Healey; Robert C. Duncan, both of Edmundston; Charles F. Roussel, St-Jacques, all of Canada

[73] Assignee: Fraser Inc., Edmundston, Canada

[21] Appl. No.: 701,675

[22] Filed: Feb. 14, 1985

[30] Foreign Application Priority Data

Apr. 17, 1984 [CA] Canada .................................... 452239

[51] Int. Cl.⁴ ....................... B01D 50/00; B01D 47/14
[52] U.S. Cl. ...................................... 422/171; 422/173; 261/96; 261/97; 261/DIG. 54; 55/226; 55/233
[58] Field of Search ....................... 422/171, 173, 191; 261/96, 97, DIG. 54; 55/226, 233

[56] References Cited

U.S. PATENT DOCUMENTS 3,737,106 6/1973 Arnold et al. .............. 261/DIG. 54
4,514,196 4/1985 Herrlander ................. 261/DIG. 54

OTHER PUBLICATIONS

J. L. Clement, "Magnesium Oxide Recovery System Design and Performance", 1966, vol. 49, No. 8, pp. 127A–134A.

*Primary Examiner*—David L. Lacey
*Attorney, Agent, or Firm*—Fleit, Jacobson, Cohn & Price

[57] ABSTRACT

A gas absorption system is disclosed. The system comprises a vertical housing having a plurality of superposed absorption stages, each stage comprising a ball bed, a plurality of venturi tubes located below the ball bed through which gas is circulated upwardly from stage to stage, a piping system for circulating an absorption liquid at each stage, the level of the absorption liquid in each stage being maintained by overflow from stage to stage, a nozzle connected to the piping system and centered over each venturi tube pointing upwardly into the ball bed for spraying absorption liquid into the ball bed to react the gas circulated through each stage with the absorption liquid, and a cap for capping each venturi tube to prevent the absorption liquid from dripping from stage to stage through the venturi tubes. Each cap includes gas openings allowing gas to flow upwardly from stage to stage to be reacted with the absorption liquid in the ball bed of each stage.

4 Claims, 5 Drawing Figures

GAS ABSORPTION SYSTEM

This invention relates to a gas absorption system and more particularly to a gas absorption system for use in a magnesium oxide recovery system for reacting sulphur dioxide with magnesium hydroxide to regenerate magnesium bisulphite for reuse in a sulphite pulp mill.

It is commonly known to use magnesium-base acid such as $Mg(HSO_3)_2$ as a cooking acid in a so-called digester to produce sulphite pulp from wood chips. The advantage in using a magnesium-base acid is that magnesium can be easily recovered from the sulphite pulp. Broadly speaking, this is done by washing the sulphite pulp to produce a weak sulphite liquor which is later concentrated by passing it through an evaporator to produce a heavy sulphite liquor which is fired in a recovery boiler. The combustion products of the sulphur and magnesium in the liquor are discharged from the boiler in a gas stream as sulphur dioxide and magnesium oxide ash. The magnesium oxide is removed from the gas stream by means of a precipitator and then slaked to produce magnesium hydroxide. The sulphur dioxide is recovered from the gas stream by reaction with the above magnesium hydroxide and some additional make up magnesium hydroxide to produce a magnesium bisulphite acid in an absorption apparatus called a scrubber. The magnesium bisulphite acid is later fortified with makeup sulphur dioxide to produce the finished cooking acid which is normally placed in a storage tank for reuse in the digester to make new magnesium bisulphite pulp. A number of papers have been published concerning magnesium pulping and recovery systems and a reference is made to a paper by J. L. Clement entitled "Magnesium Oxide Recovery System Design and Performance" published in Tappi, Vol. 49, No. 8, August 1966, for a more complete description of such systems.

A known scrubber which is used for contacting $SO_2$ with $Mg(OH)_2$ is the so-called Flakt scrubber which is made by Flakt Industri AB, Sweden. This scrubber has a number of superposed absorption stages each including eight venturi tubes through which the $SO_2$ gas is passed upwardly and a ball bed above the venturi tubes. The absorption liquid is continuously recirculated in each stage and is sprayed by means of a splash plate installed at the throat of each venturi tube. The absorption liquid is mixed with the $SO_2$ gas and the mixture entrained by the gas lift into the ball bed where magnesium bisulphite acid is produced and falls back into the absorption liquid to be recirculated in each stage.

A major problem encountered in the operation of the above Flakt scrubber is that a discharge header was brought down into the center of each venturi tube perpendicular to the face of the splash plate to within a short distance from the splash plate. The recirculated absorption liquid or acid was directed to the splash plate and upward into the ball bed by plate design and by maintaining a predetermined $SO_2$ gas velocity at the venturi throat. Any particle in the recirculated acid larger than the gap between the end of the header and the splash plate, such as monosulphite scale, rubber from pinch valves, parts of the bed balls etc, would not pass through the gap and eventually plug. This resulted in regular shutdowns to clean splash plates. In addition, several so-called absorption stage wash were also required in between shutdowns to remove scale and maintain flow to the stages.

Another major problem associated with the Flakt scrubber was the lack of flexibility of operating range:

To match normal sulphite pulp daily production of about 600 tons per day (T/D), three venturi tubes had to be blanked in the scrubber to maintain a minimum $SO_2$ gas lift of 20 M/sec through each venturi tube so as to maintain proper acid level in each absorption stage. Theoretically this would prevent dripping by the splash plates from one stage to the stage below.

Operating with five venturi tubes open (out of eight), the heavy sulphite liquor firing rate to the boiler was supposed to be 600 $M^3/D$. However, operating experience proved 800 $M^3/D$ to be the minimum firing rate to provide the required lift in the venturi tubes to maintain the acid level in each stage.

When the digester operation was reduced below 500 T/D, the heavy liquor firing rate to the boiler could not be cut back and resulted in overfilling the cooking acid storage tank. On the average, several shutdowns per month were required due to high cooking acid storage levels.

As each stage splash plates started plugging, as mentioned previously, the minimum heavy liquor firing rate to the boiler had to be increased above 800 $M^3/D$ in order to have sufficient $SO_2$ gas lift to maintain proper acid level in each stage. When the scrubber was operated at a lower rate than required, the splash plates in the worse stage would leak by more than the make up rate could supply and the stage would eventually pump itself dry. This could cause pump cavitation and sometimes pump and piping damage. The sample to the pH meter which are used to control the acidity in each stage would not be constant and sometimes cause excessive $Mg(OH)_2$ to be added to the stage and cause monosulphite scale formation. This could happen to any of the stages depending on which one was plugged most at the splash plates at that time.

Still another problem associated with the Flakt scrubber was the system backpressure. By blanking three venturi tubes the backpressure on the scrubber was increased. This caused problems with the operation of the sulphur burner used to produce make-up sulphur dioxide to the scrubber as the fan of the sulphur burner was not designed for the increased pressure. In addition, the induced draft fan used to feed the $SO_2$ gas from the precipitator to the scrubber was also not designed to provide the increased pressure. The above system overpressure reduced the maximum heavy liquor firing rate to 1000 $M^3/D$.

The above drawbacks have been overcome, in accordance with the present invention, by eliminating the splash plate located at the throat of each venturi tube of the Flakt scrubber and by replacing it with a nozzle centered over each venturi tube pointing upward toward the ball bed. The top of each venturi tube was capped to prevent the absorption liquid from short-circuiting from stage to stage. The capping means included gas opening allowing gas to circulate upwardly from stage to stage to be contacted with the absorption liquid in the ball bed of each stage.

The invention will now be disclosed, by way of example, with reference to the accompanying drawings in which.

Figure 1:
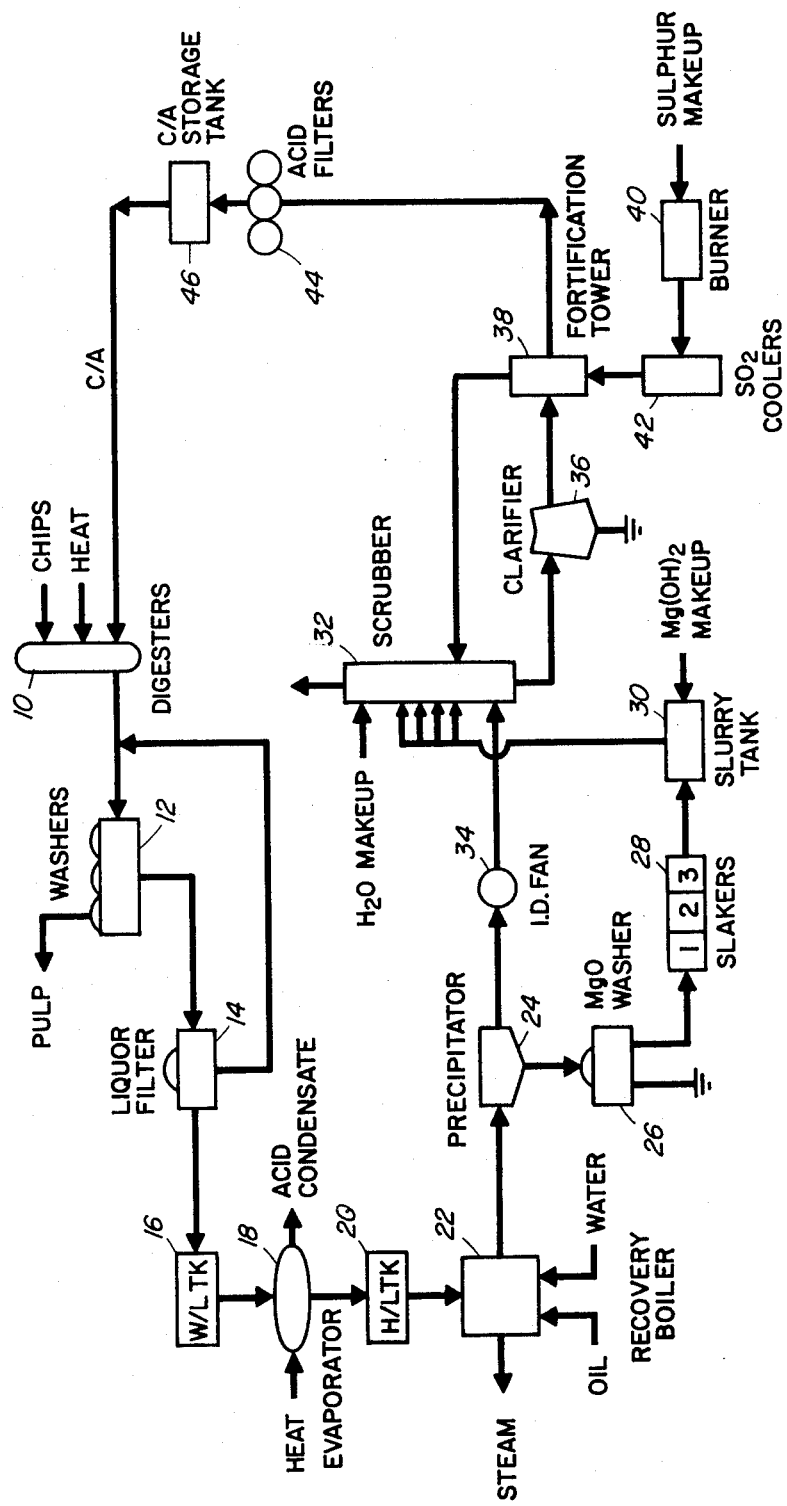
FIG. 1 is a flow diagram of a conventional liquor recovery cycle incorporating the modified scrubber in accordance with the present invention.

Referring to FIG. 1, wood chips are heated with a magnesium bisulphite cooking acid (C/A) in digesters 10 and the pulp and spent sulphite liquor are discharged into washers 12. The liquor is passed through a filter and the filtrate having 13–15% solids is fed to a weak liquor storage tank 16. Some of the weak liquor is recycled to the washers. The weak liquor is concentrated in an evaporator 18 and transferred to a heavy liquor storage tank 20 at a concentration between 55–57% solids as required for operation of the recovery system. The heavy liquor is fired in a recovery boiler 22 and the combustion products of the sulphur and magnesium in the liquor are discharged from the boiler in a gas stream as sulphur dioxide and solid particles of magnesium oxide ash. The major portion of the magnesium oxide is removed from the gas stream in a precipitator 24 and washed in a washer 26. The magnesium oxide from the washer is fed to slakers 28 to produce magnesium hydroxide which is stored in a slurry tank 30. This magnesium hydroxide slurry together with some makeup is fed to a scrubber 32. The sulphur dioxide from the precipitator 24 is forced to flow upwardly through the scrubber 32 by an induced draft fan 34, countercurrent to the magnesium hydroxide flow, so as to recover the sulphur dioxide by reaction with the magnesium hydroxide to produce magnesium bisulphite acid. This acid is fed to a conventional clarifier 36 and then to a fortification tower 38 where it is fortified with makeup sulphur dioxide coming from a sulphur burner 40 through coolers 42. Some $SO_2$ makeup is also fed to the scrubber through the fortification tower. The finished cooking acid is fed through filters 44 and stored in a cooking acid storage tank 46 for reuse in the digesters 10.

Figure 2:
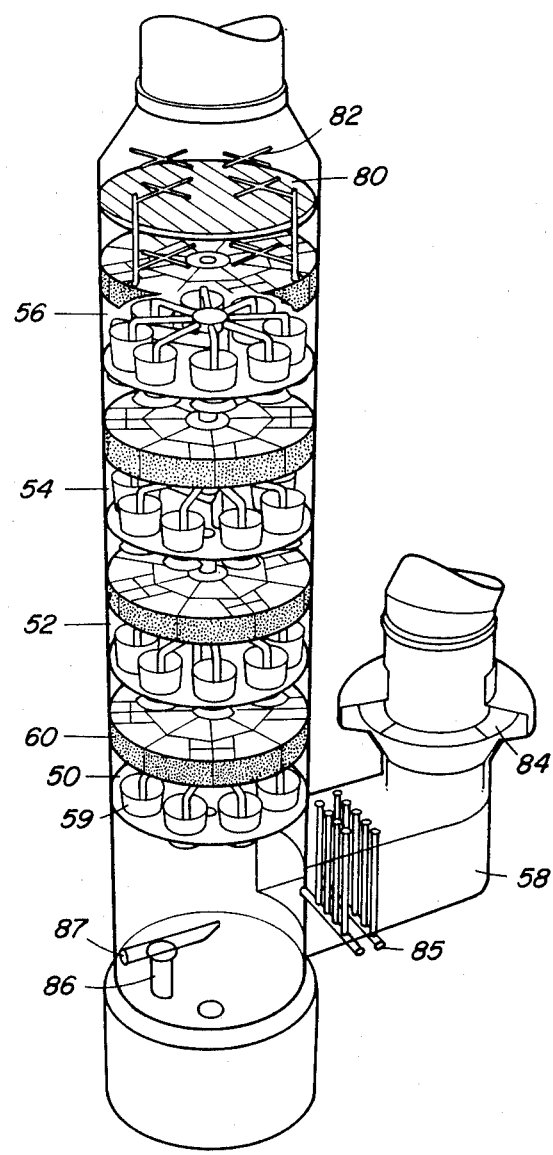
FIG. 2 is a perspective view of a Flakt scrubber.
Figure 3:
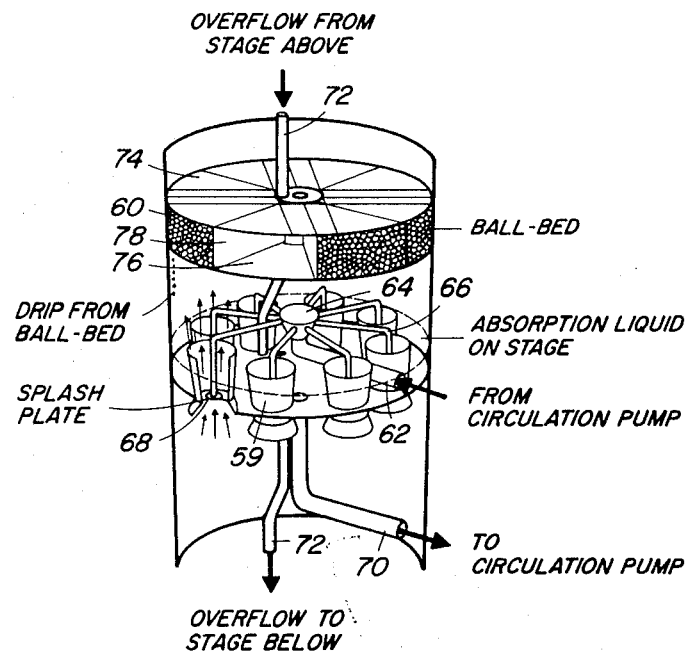
FIG. 3 is a perspective view of one stage of the scrubber shown in FIG. 2.
Figure 4:
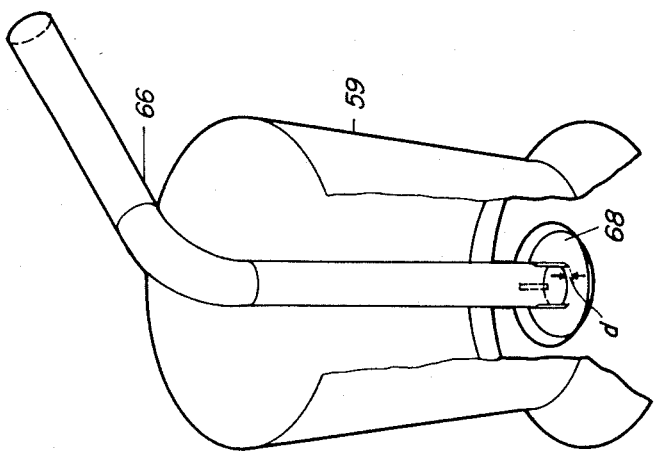
FIG. 4 is a enlarged cut-away view of one of the venturi tubes shown in FIG. 3 showing the splash plate located at the throat of each venturi tube.

Referring to FIG. 2, the Flakt scrubber comprises four absorption stages 50, 52, 54 and 56 and one cooling stage 58 which is also used for absorption. As more clearly seen in FIG. 3, each absorption stage consists of eight venturi tubes 59 through which the $SO_2$ gas is circulated upwardly, and a ball bed 60 above the venturi tubes. The absorption liquid is continuously circulated through each stage by means of a circulating pump (not shown). It is fed in through an inlet pipe 62 which leads to a manifold 64 provided with eight discharge headers 66 each being brought down into the center of a venturi tube perpendicular to a splash plate 68. As shown more clearly in FIG. 4, each splash plate 68 is attached to the header at a short distance "d" therefrom so as to leave a small gap between the end of the header and the splash plate. The absorption liquid is directed to the splash plate so as to spray upward into the ball bed by plate design and by maintaining a predetermined $SO_2$ gas velocity or lift at the venturi throat. The absorption liquid flows out of each stage through an outlet pipe 70. The level of liquid in each stage is maintained by means of an overflow pipe 72.

The ball bed comprises a number of balls ressembling pingpong balls in appearance and are kept in position between two nets 74 and 76 which are suitably placed apart from each other so that the balls can move rather freely. For the purpose of ball movement, each ball bed has been divided into a number of sections with transversal plates 78. The purpose of the ball bed is merely to increase the transfer surface for absorption but a high degree of self-cleaning is also obtained through vigorous movement in the bed.

At the top of the scrubber, there is a demister 80. The demister is intermittently flushed with water by means of two nozzle banks 82.

The cooling stage 58 consists of an overflow weir 84 and two nozzle banks 85. One nozzle bank is used to recirculate the absorption liquid similar to the absorption stages 50, 52, 54 and 56. The other nozzle bank is connected to emergency water supply for cooling should the other nozzle bank or circulating pump fail.

The flue gas stream from the boiler containing $SO_2$ enters the scrubber through the cooling stage and moves up the tower through stages 50, 52, 54 and 56. The $SO_2$ gas is absorbed by adding $Mg(OH)_2$ slurry to the recirculated acid in each stage to maintain pH at prescribed levels. Acid strength is controlled and the pH in each stage is maintained by adding make up water to the upper stage 56 causing an overflow condition from one stage to the stage below eventually to the cooling stage pump which is provided with an emergency overflow 86. Make up $SO_2$ is added to the scrubber from the fortification tower by means of an inlet pipe 87.

Figure 5:
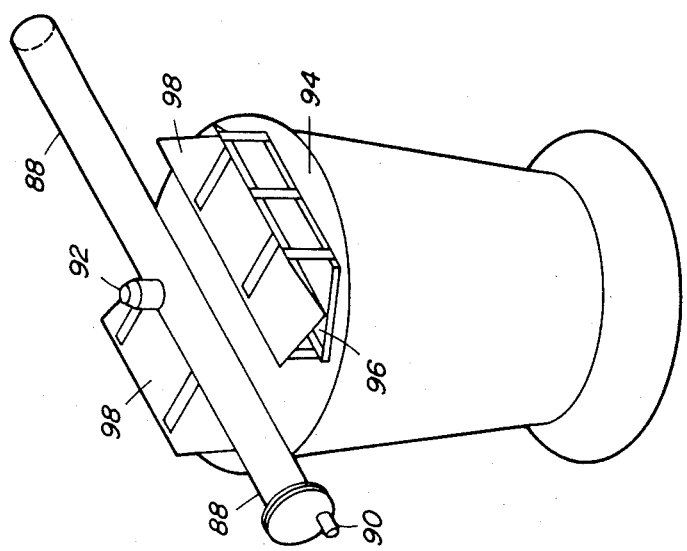
FIG. 5 is a view similar to that of FIG. 4 showing the scrubber modifications, in accordance with the present invention.

Referring to FIG. 5 which shows the modifications made to the scrubber, in accordance with the present invention, it would be seen that the splash plate 68 and the associated header 66 connected to manifold 64 is now eliminated and replaced by a straight pipe 88 going through the scrubber wall to a flange with a clean out connection 90. A nozzle 92 is centered over the venturi 59 pointing upward into the ball bed 60. It would be understood however that it is not absolutely necessary to extend the pipe 88 through the scrubber wall when a clean out connection is not needed. The top of each venturi tube 59 is closed with a cover 94 to prevent dripping of the absorption liquid through the venturi tube and two vents 96 with hats 98 are cut in the venturi cover 94 to prevent dripping of the absorption liquid while allowing upward flow of the gas.

The above modifications have the following advantages over the Flakt design:

1. The small gap (5/16") between the header 66 and splash plate 68 has been replaced by a nozzle with a larger (2¾") free opening. Most of the material previously causing splash plate plugging problems can now pass through this opening. This reduces the downtime for maintenance and no more absorption stage wash are required. The larger opening allows full flow recirculation of the absorption liquid, higher velocities and less settling in the stages.

2. There is no need to maintain a predetermined gas volume and velocity through each venturi in order to maintain proper absorption liquid levels in each absorption stage. The level is always maintained at any gas flow since there is no more liquid short circuiting from stage to stage due to the capping of the venturi tubes and use of slots with hats for proper gas flow. The above ensures flexibility of operating range. The heavy liquor firing rate to the boiler can now be matched with pulpmill production. Such firing rate may now range from 540 $M^3/D$ to 1150 $M^3/D$ to match pulpmill production of 350 T/D to 650 T/D.

3. By opening all venturi tubes the back pressure is reduced and the operation of the sulphur burner and induced draft fans greatly improved.

4. Reduction of stack emissions from 150 PPM to 50 PPM has also been noted thereby lowering pollution in the area.

5. The above modifications also permit reduction in the number of absorption stages needed in the scrubber, thereby reducing cost of the equipment.

6. Finally, the above modifications reduce maintenance time and costs.

Although the above invention has been disclosed with reference to a preferred embodiment and with reference to a specific application, it is to be understood that it is not limited to such embodiment or application but by the scope of the claims only.

We claim:

1. A gas absorption system comprising a vertical housing having a gas inlet at its lower end and a gas outlet at its upper end and a plurality of superposed absorption stages between said gas inlet and outlet, each stage comprising:
    (a) a ball bed
    (b) a plurality of venturi tubes located below said ball bed through which gas is circulated upwardly from stage to stage;
    (c) a piping system for circulating an absorption liquid at each stage, the level of said absorption liquid in each stage being maintained by overflow from stage to stage;
    (d) a nozzle connected to said piping system and centered over each venturi tube pointing upwardly toward the ball bed for spraying absorption liquid into the ball bed to react the gas circulated through each stage with the absorption liquid; and
    (e) means for capping each venturi tube to prevent the absorption liquid from dripping from stage to stage through the venturi tubes, said capping means including gas openings allowing gas to flow upwardly from stage to stage to be reacted with the absorption liquid in the ball bed of each stage.

2. A system as defined in claim 1, wherein said gas is $SO_2$ and said absorption liquid is $Mg(HSO_3)_2$ and further comprising a slurry tank containing $Mg(OH)_2$ connected to each of said piping systems for adding said $Mg(OH)_2$ slurry thereto.

3. A system as defined in claim 2, further comprising means for adding a water makeup to the upper end of the housing causing an overflow condition from stage to stage and for maintaining the pH in each stage at prescribed levels.

4. A system as defined in claim 1, further comprising a cooling stage located at the gas inlet into the gas absorption system for cooling the gas.

* * * * *